United States Patent [19]
Suzuki

[11] Patent Number: 5,463,445
[45] Date of Patent: Oct. 31, 1995

[54] METHOD AND APPARATUS FOR IMAGE PHOTOMETERING

[75] Inventor: Kenji Suzuki, Kanagawa, Japan

[73] Assignee: Fuji Photo Film Co., Ltd., Kanagawa, Japan

[21] Appl. No.: 286,789

[22] Filed: Aug. 5, 1994

Related U.S. Application Data

[63] Continuation of Ser. No. 974,522, Nov. 12, 1992, abandoned.

[30] Foreign Application Priority Data

Nov. 13, 1991 [JP] Japan .................................. 3-297275

[51] Int. Cl.$^6$ .................................................. G03B 27/80
[52] U.S. Cl. .................................. 355/71; 355/41
[58] Field of Search .......................... 355/32, 31, 38, 355/41, 71

[56] References Cited

U.S. PATENT DOCUMENTS

| | | | |
|---|---|---|---|
| 4,509,854 | 4/1985 | Pearson | 355/38 |
| 4,951,084 | 8/1990 | von Stein et al. | 355/38 |
| 5,162,841 | 11/1992 | Terashita | 355/38 |

FOREIGN PATENT DOCUMENTS

| | | |
|---|---|---|
| 1142719 | 6/1989 | Japan . |
| 3230146 | 10/1991 | Japan . |

OTHER PUBLICATIONS

English Language Abstract of Japanese Patent Application Laid-Open No. 3-230146, Takaaki Terashita, Oct. 14, 1991, p. 1296.

Primary Examiner—Russell E. Adams
Assistant Examiner—D. P. Malley
Attorney, Agent, or Firm—Sughrue, Mion, Zinn, Macpeak & Seas; Richard C. Turner; Peter A. McKenna

[57] ABSTRACT

A method for measuring image density of a color original in advance for adjusting exposure with which an image of the color original is to be printed on a photosensitive material which includes the steps of: conveying a negative film to a photometering stage provided with an opening through which light passes; irradiating light onto an image recorded on the negative film on the stage; making light having passed through each pixel of the image incident onto a spectral filter having a plurality of interference filter sections each of which transmits light of a different wavelength, and which are arrayed in a conveying direction of the negative film; and photometering each light wave having passed through respective interference filter sections of a spectral filter by means of a photometer. The spectral filter is optically arranged such that light waves which pass through respective divisions of the opening divided into units of pixel rows, are made incident onto different interference filter sections. After completion of the aforementioned photometering steps, the negative film is moved forward successively by a pixel row, each light wave having passed through the respective interference filter sections of the spectral filter is measured so as to photometer the light having passed through respective pixels on the negative film for various wavelengths.

11 Claims, 8 Drawing Sheets

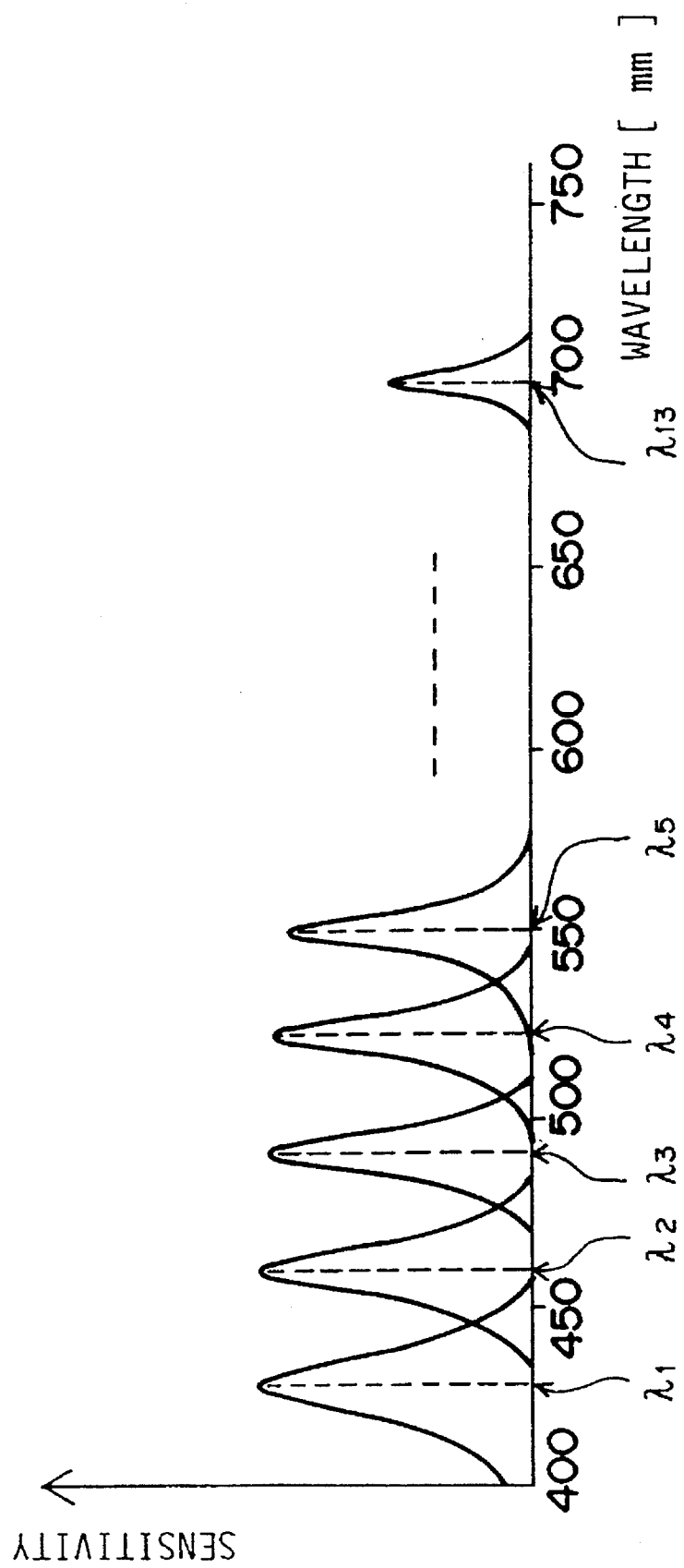

METHOD AND APPARATUS FOR IMAGE PHOTOMETERING

This is a continuation of application Ser. No. 07/974,522 filed Nov. 12, 1992, now abandoned.

BACKGROUND OF THE INVENTION (1) Field of the Invention

The present invention relates to a method and apparatus for photometering an image recorded on a film.

(2) Description of the Related Art

Generally, an exposure with which a color image is printed from a color original onto a photosensitive material is determined with respect to each of three primary colors R(red), G(Green) and B(blue) by measuring integral transmission (or reflection) density for respective colors R(red), G(Green) and B(blue) by means of a photometering apparatus equipped with color separation filter composed of colored dye filters and/or deposition filters. In order to determine an exact exposure, it is necessary to measure a light amount actually affecting the photosensitivity of a photosensitive material. This requires that a spectral sensitivity distribution of the photometering apparatus be made coincident with that of the photosensitive material. The spectral sensitivity distribution of the photosensitive material is asymmetrical with respect to a wavelength at which the photosensitivity becomes maximum. To produce an asymmetrical distribution of transmittance using colored dye filters and/or deposition filters, however, requires complicated combinations of many filters. For this reason, it is difficult not only to mass-produce photometering apparatuses, but also to manufacture these with good precision.

To overcome this problem, in the art of a photoresist exposure apparatus, a technology is known in which light from an original is separated into spectral light waves and the thus separated light waves are weighted and added, so that the spectral sensitivity distribution of a photometering apparatus is made coincident with the spectral sensitivity distribution of a photosensitive material. As an example of this art, Japanese Patent Application Laid-Open No. 1-142719 discloses a method of color printing using a prism (or diffraction grating), lenses and two-dimensional array sensors and an apparatus using this method. In this method of color printing, an original is divided into a plurality of sub-sections, and light having passed through the sub-sections of the original is paralleled by lenses. Then the thus paralleled light is made incident upon a prism to be separated into a spectrum. The thus formed spectral light waves refracted at different angles in accordance with their respective wavelengths are emitted from the prism to be measured for light intensity by means of a two-dimensional array sensor. The measurement is conducted for each of the sub-sections of the original.

This method of color printing, however, requires the use of an expensive prism (or diffraction grating) resulting in high cost. Further, when a prism is employed, it is necessary to prepare a point light source through a slit in order to form the incident light on the prism into parallel light, resulting in loss of light utilization. Moreover, the above method makes use of refraction or diffraction of light, which disadvantageously makes the photometering structure bulky.

SUMMARY OF THE INVENTION

It is an object of the present invention to provide a method of photometering an image, which allows photometering to be carried out with an improved use efficiency of light by a photometering arrangement that is reduced in size and cost.

According to the present invention, a method of photometering an image comprises the steps of: irradiating light onto an image recorded on a film; making the light after passing through the image incident onto a spectral filter composed of a plurality of interference filter sections which is arranged along one direction and each of which selects a certain wavelength range of light having a different wavelength as the center thereof; and photometering light waves after passing through respective pixels and being selected by the interference filter sections, for every pixel of the image, with respect to each of the light waves having different wavelength ranges while relative movement between the interference filter and the film is effected along the aforementioned one direction.

The above light irradiation is carried out generally by arranging the film on a stage that has an opening through which the light passes. The above-stated spectral filter is preferably provided in an optical arrangement in which light waves that pass through different divisions of the opening divided along the one direction by the same number with that of the interference filter sections, is made incident on respective interference filter sections. For this reason it is preferable to provide optical elements such as lenses and the like between the stage and the filter.

It is preferable that while the film is moved forward on the opening by the width of a division of the opening as a unit, in the direction along which the interference filter sections of the spectral filter are arranged, light transmitted through pixels of the film present in each division and passing through an interference filter section optically corresponding to the division is measured for light intensity, so as to measure the transmission light intensity with respect to each of the wavelength ranges for each pixel on the film. It is preferable that the size of the division divided is approximately equal to that of a pixel row on the film. The light waves selected by the interference sections of the spectral filter are preferably measured by a photometer having a plurality of photosensors arranged in two dimensions. With the arrangement stated above, it is possible to readily obtain spectral characteristics for each pixel, and the thus obtained spectral characteristics are corrected in the following steps so as to coincide with the spectral sensitivity distribution of a printing paper.

The spectral filter may be constructed such that the interference filter sections are arranged in a terraced form in the aforesaid one direction. The spectral filter can also be constructed such that thickness of the interference filter sections is continuously increased in the aforesaid one direction.

The spectral filter can be composed of a transmission type interference filter or reflection type interference filter. The photometric measurement may be carried out on an exposure apparatus or on a photometering stage additionally provided. In the former case, an exposure stage is used for the photometering stage.

In accordance with another aspect, the present invention is to provide a method of controlling exposure of a negative film, including the aforementioned method of photometering an image.

Thus, according to the present invention, since a spectral filter is used for separating light in place of an expensive prism, diffraction grating etc., a photometering arrangement can be provided at low cost. In the present invention, by moving the image relative to the interference filter, light transmitted through the image passes through interference sections of plural colors, so that the light can be separated into a spectrum. Accordingly, neither would the optical path along which the spectral light passes become long nor would the photometering position be varyed largely compared with a case in which spectral light is photometered using a prism and/or diffraction grating. Therefore, the photometering arrangement can be made smaller. Further, light to be incident upon the spectral filter is not required to be paralleled unlike when a prism is employed so the use efficiency can be increased.

In accordance with another aspect of the present invention, an apparatus is provided for measuring image density of an color original in advance for adjusting the exposure with which a color image of the color original is printed on a photosensitive material, comprising: a photometering stage for supporting a negative film, provided with an opening through which light passes; means for irradiating light onto an image recorded on the negative film on the stage; a spectral filter with a plurality of interference filter sections each of which receives light having passed through a pixel of the image and transmits light of only a certain wavelength range of light having a different wavelength as the center thereof, and which are arrayed in a conveying direction of the negative film; optical means for making light, passing through respective divisions into which the opening is divided as a unit of the pixel row on the negative film along the conveying direction of the negative film, incident onto different interference filter sections of the spectral filter; means for photometering each of light waves having passed through respective pixels and respective interference filter sections of the spectral filter; shifting means for shifting the negative film on the stage successively in the conveying direction of the negative film by the width of a pixel row as a unit; and controlling means for controlling the shifting means so as to measure the transmitted light having passed through respective pixels on the negative film for different wavelengths each of which is transmitted by the interference filter section.

BRIEF DESCRIPTION OF THE DRAWINGS

FIG. 5 is a chart showing spectral sensitivity distribution curves of a spectral filter;

DESCRIPTION OF THE PREFERRED EMBODIMENTS

A description will now be made of an embodiment of the present invention with reference to the drawings.

Figure 1:
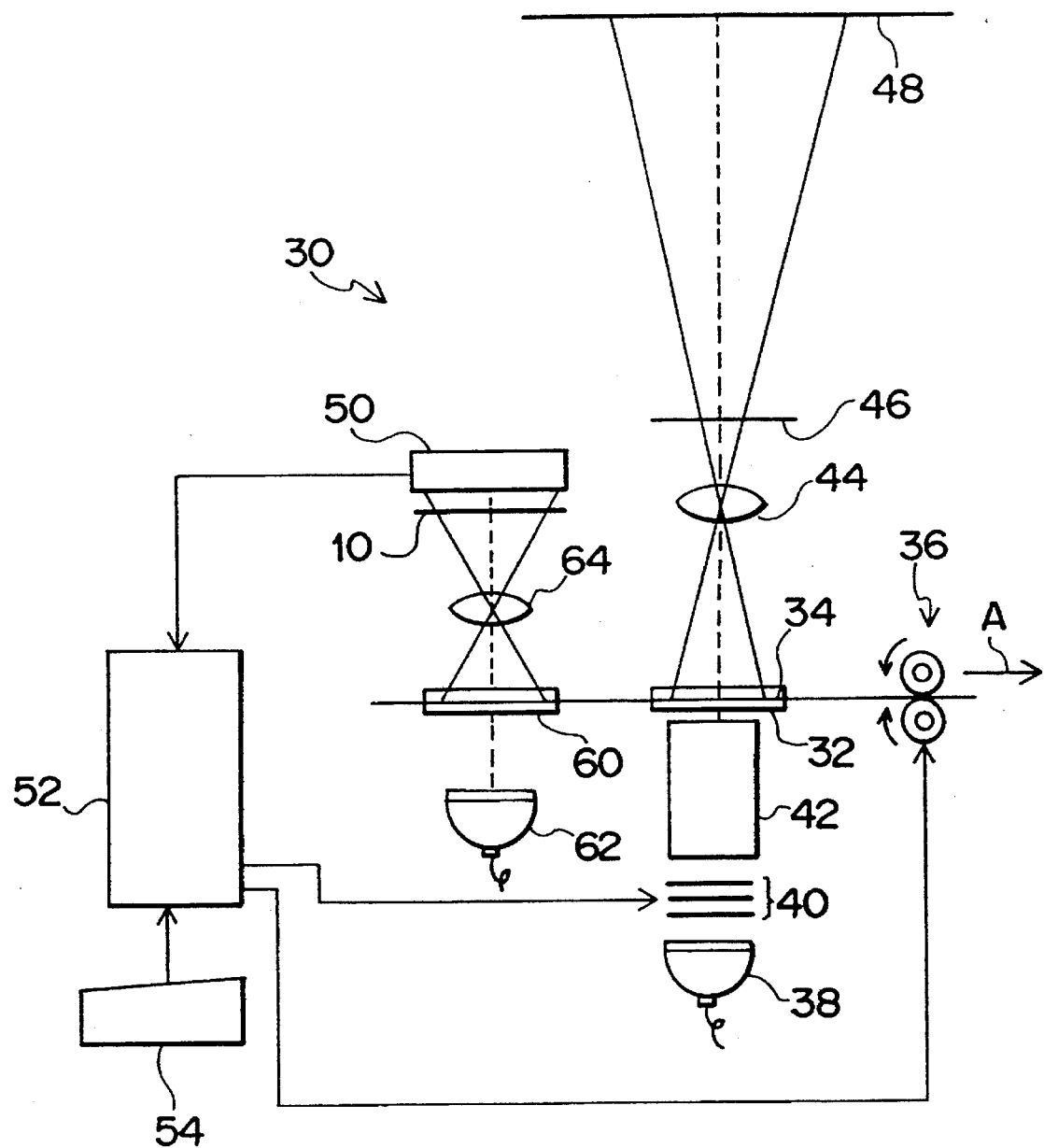
FIG. 1 is a diagram showing a schematic configuration of a printer according to an embodiment of the present invention.

FIG. 1 shows a printer 30 to which the method of the present invention can be applied.

The printer 30 includes as a light source for exposure, a lamp house 38 which comprises a halogen lamp and a reflector for upwardly reflecting light emitted from the halogen lamp. Above the lamp house 38, a light adjustment filter 40 comprising a CC filter group consisting of a C (cyan) filter, a M (magenta) filter, and an Y (yellow) filter, and a light diffusion box 42 are successively arranged.

Disposed above the light diffusion box 42 is an exposure stage 32 through which a developed negative film 34 set in the printer 30 is passed. An unillustrated rectangular opening is provided in the exposure stage through which the light emitted from the lamphouse 38 passes. The opening has a size corresponding to that of an image 34A recorded on the negative film 34 set in the printer 30 (see FIG. 2A).

Above the exposure stage 32, a lens 44, a black shutter 46 and a color paper 48 are successively arranged to form an image-forming optical system. The arrangement is such that a light beam emitted from the lamphouse 38 passes through the light adjustment filter 40 and the light diffusion box 42 and is focused by the lens 44 to form an image on the color paper 48.

The exposure stage 32 is sandwiched between a feeding portion 36 and a photometering portion which are in opposed relationship to each other. The feeding portion is equipped with a pair of feed rollers for holding the negative film 34 therebetween. When the rollers are rotated, the negative film 34 is conveyed in the direction of arrow A shown in FIG. 1. The feeding portion 36 is electrically connected to, and controlled by, a control circuit 52, such that a plurality of image frames recorded on the negative film 34 are positioned on the photometering stage 60 and the exposure stage 32, sequentially.

Figure 2A:
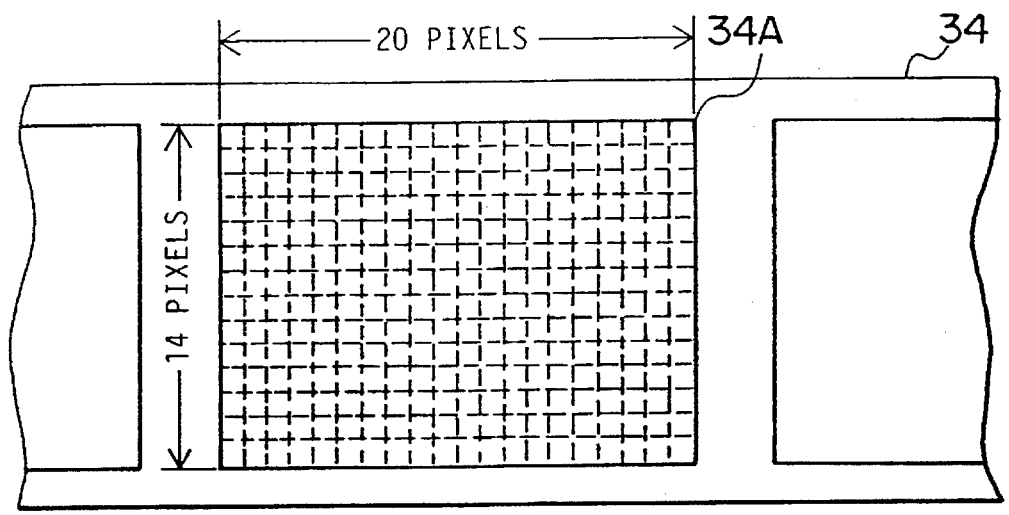
FIG. 2A is a plan view showing a negative film for illustrating the concept of pixel.
Figure 2B:
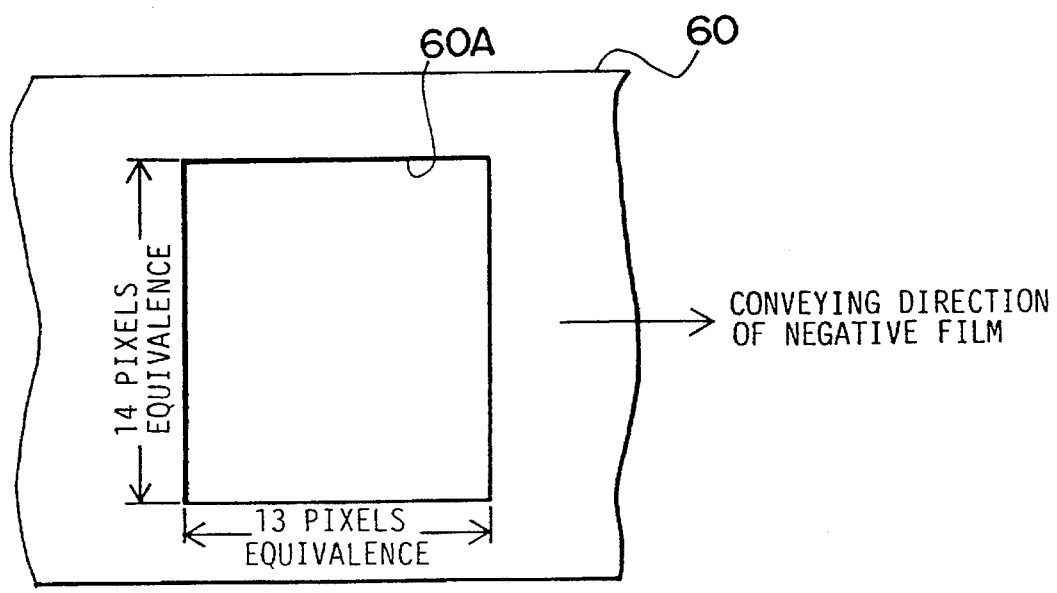
FIG. 2B is a plan view showing a photometering stage.

As shown in FIG. 2B, the photometering stage 60 is provided with a rectangular opening 60A, through which light emitted from a lamphouse 62 arranged below the photometering stage 60 is passed. Here, in this embodiment, the image frame 34A recorded on the negative film 3 is divided into 20×14 pixels, as shown in FIG. 2A, so that every pixel is measured on spectral characteristics as will be detailed hereinafter. As shown in FIG. 2B, the opening 60A in the photometering stage 60 is provided such that the length in the conveying direction of the negative film 34 contain just thirteen pixels and the size in the perpendicular direction to the feeding direction is equivalent to just fourteen pixels.

Figure 3:
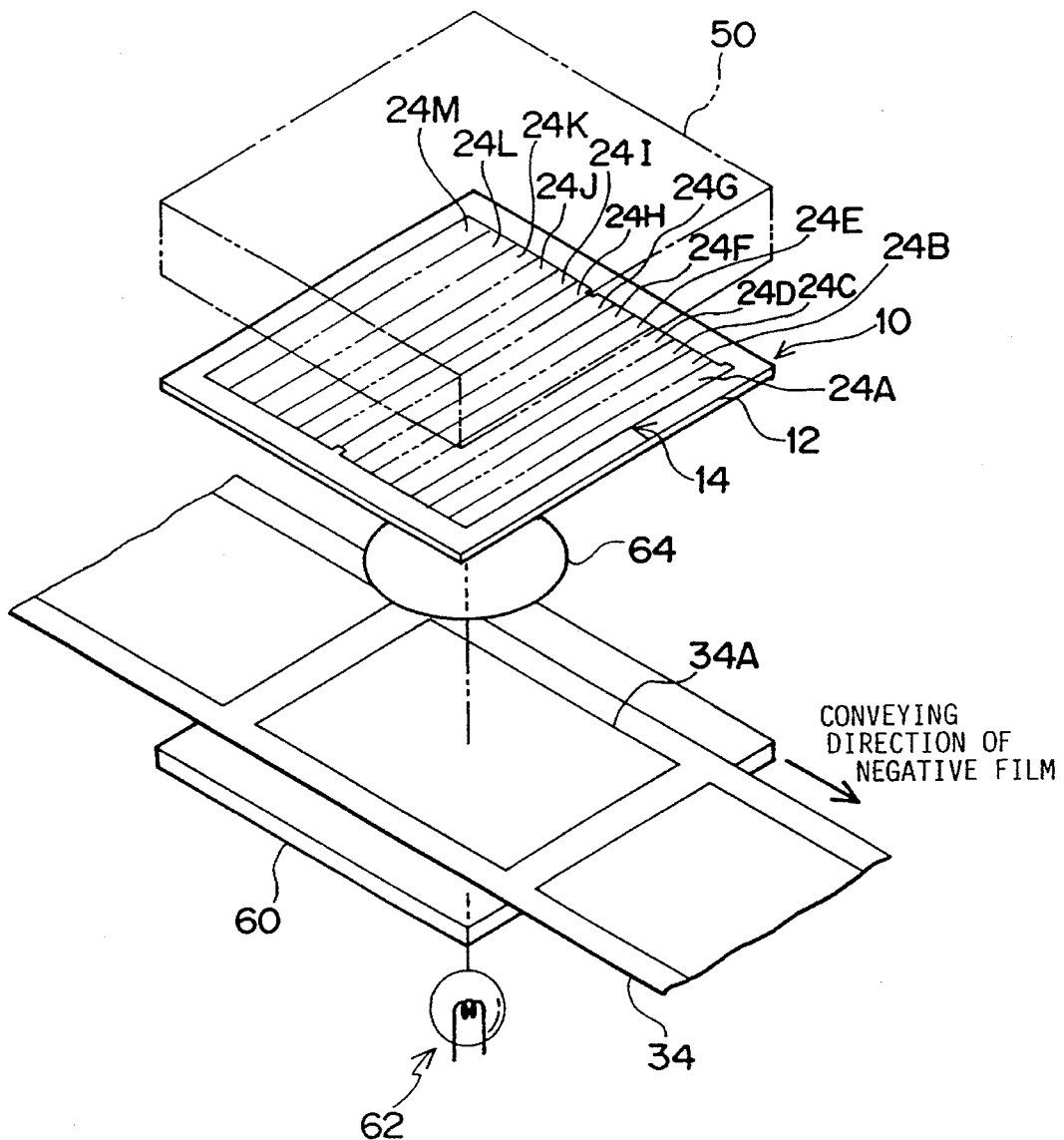
FIG. 3 is a perspective view showing an arrangement of a spectral filter.
Figure 4A:
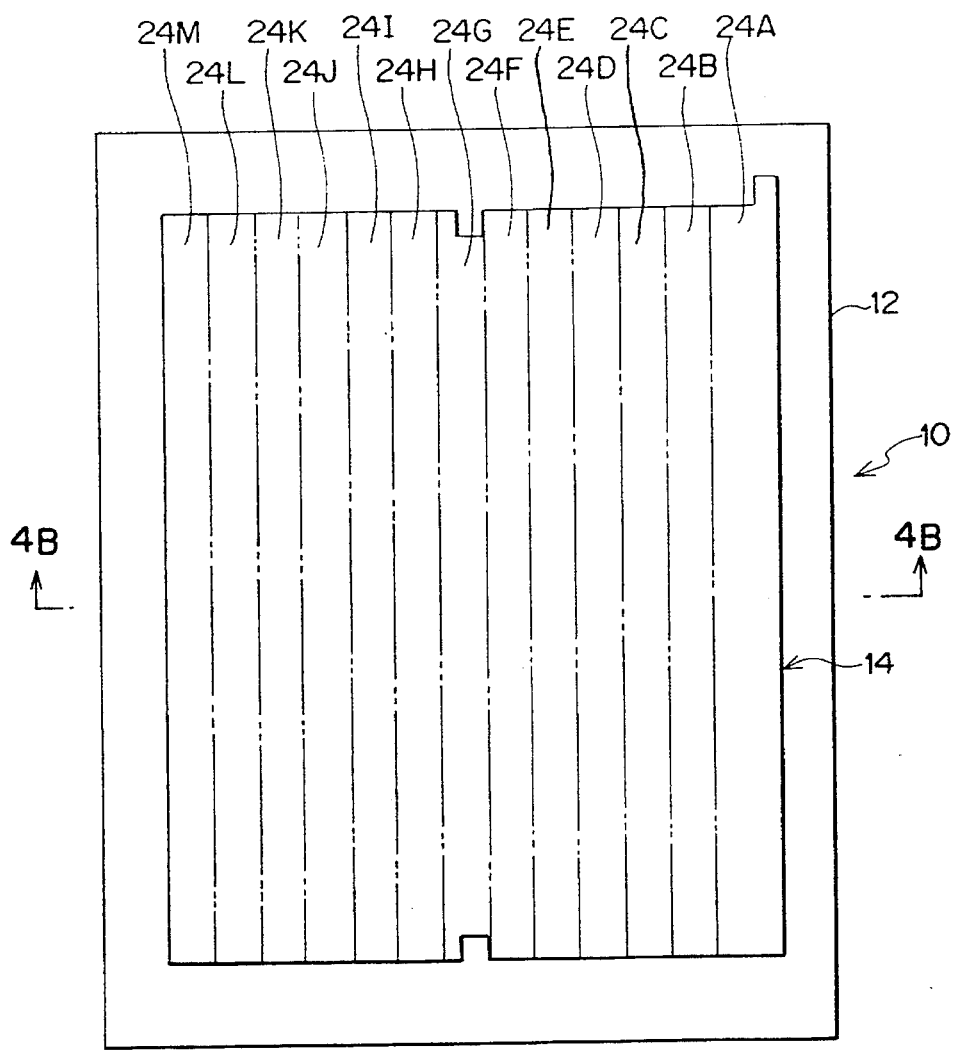
FIG. 4A is a plan view showing a spectral filter.
Figure 4B:
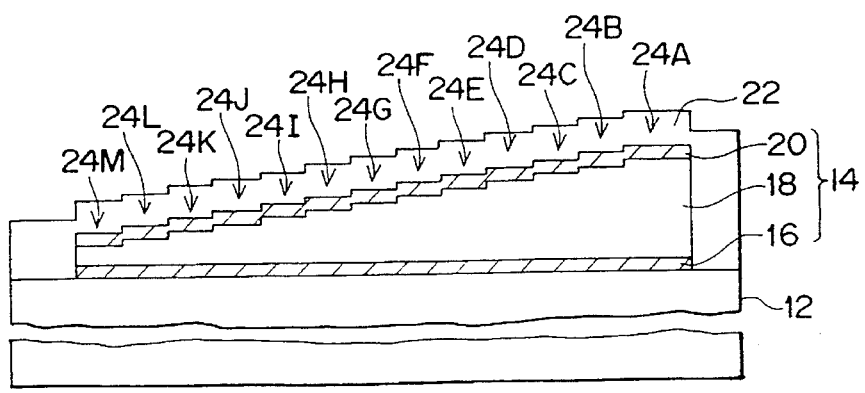
FIG. 4B is a sectional view of FIG. 4A taken along a line 4B—4B.

As shown in FIGS. 1 and 3, above the photometering stage 60, a lens 64 and a spectral filter 10 are disposed in this order. The spectral filter 10 comprises, as shown in FIG. 4A, a transparent glass substrate 12 and a metal-deposited filter section 14 in the center portion of the substrate 12. FIG. 4B shows a cross-section of the spectral filter cut along a line 4B—4B. The filter section 14 comprises an Ag-membrane 16 deposited on the surface of the glass substrate 12, a low-refraction index film 18 of magnesium fluoride ($MgF_2$) on the Ag membrane 16 and an Ag membrane 20 coated on the low-refraction index film 18. Here, the low-refraction index film 18 has a terraced structure, that is the thickness increases step by step across from the one side of the filter section 14 to the other. In addition, an $SiO_2$ film 22 is coated over the glass substrate 12 and the filter section 14.

Each small section having a constant thickness of the low-refraction index film 18 changes in thickness in a stepped manner and together with corresponding sections of the Ag-membranes 16 and 20, forms an interference filter section. Accordingly the filter section 14 includes thirteen interference filter sections 24A to 24M, each of which will transmit due to the effect of interference only a specific range of light having a specific wavelength $\lambda_1, \lambda_2, \ldots$ or $\lambda_{13}$ as a center thereof, dependent upon the thickness of the low-refraction index film 18. The characteristics of the spectral sensitivity with regard to the interference filter is shown in FIG. 5. The interference filter may separate light within a range from visual light rays to near infrared rays. Although the boundaries between the interference filters are invisible in practice, they are shown as imaginary lines in FIG. 4.

As shown in FIG. 3, the spectral filter 10 is arranged above the negative film 34 such that the interference filter sections 24A through 24M are arranged in the conveying direction of the negative film 34. When the image frame 34A of the negative film 34 is conveyed to the opening 60A of the photometering stage 60, 13×14 pixels of the pixels which constitute the image frames 34A are laid upon the opening 60A. Fourteen pixel rows along the direction perpendicular to the conveying direction of the negative film 34 correspond to the interference filter sections 24A to 24M of the spectral filter, respectively. The optical characteristics and location of the lens 64 are determined so that each beam of light having passed through a pixel row may pass through the corresponding interference filter section of the spectral filter 10 and thirteen bands of light transmitted through respective pixel rows may be introduced to different interference filter sections.

A photometer 50 comprising a number of optical sensors arranged in two dimensions are disposed above the spectral filter 10. As shown in FIG. 1, the photometer is electrically connected to the control circuit 52 having a keyboard 54 connected thereto for inputting data, etc. In the control circuit 52, photometered values on a reference negative film 10 are stored in advance. The control circuit 52 determines an exposure condition in accordance with the photometric measurement values inputted from the photometer 50 and the photometered values of the above-mentioned reference negative film. The control circuit 52 effects an exposure operation by controlling positions of the respective filters in the light adjustment filter 40 so that the actual exposure condition for the color paper 48 is coincident with the predetermined exposure condition.

Figure 6:
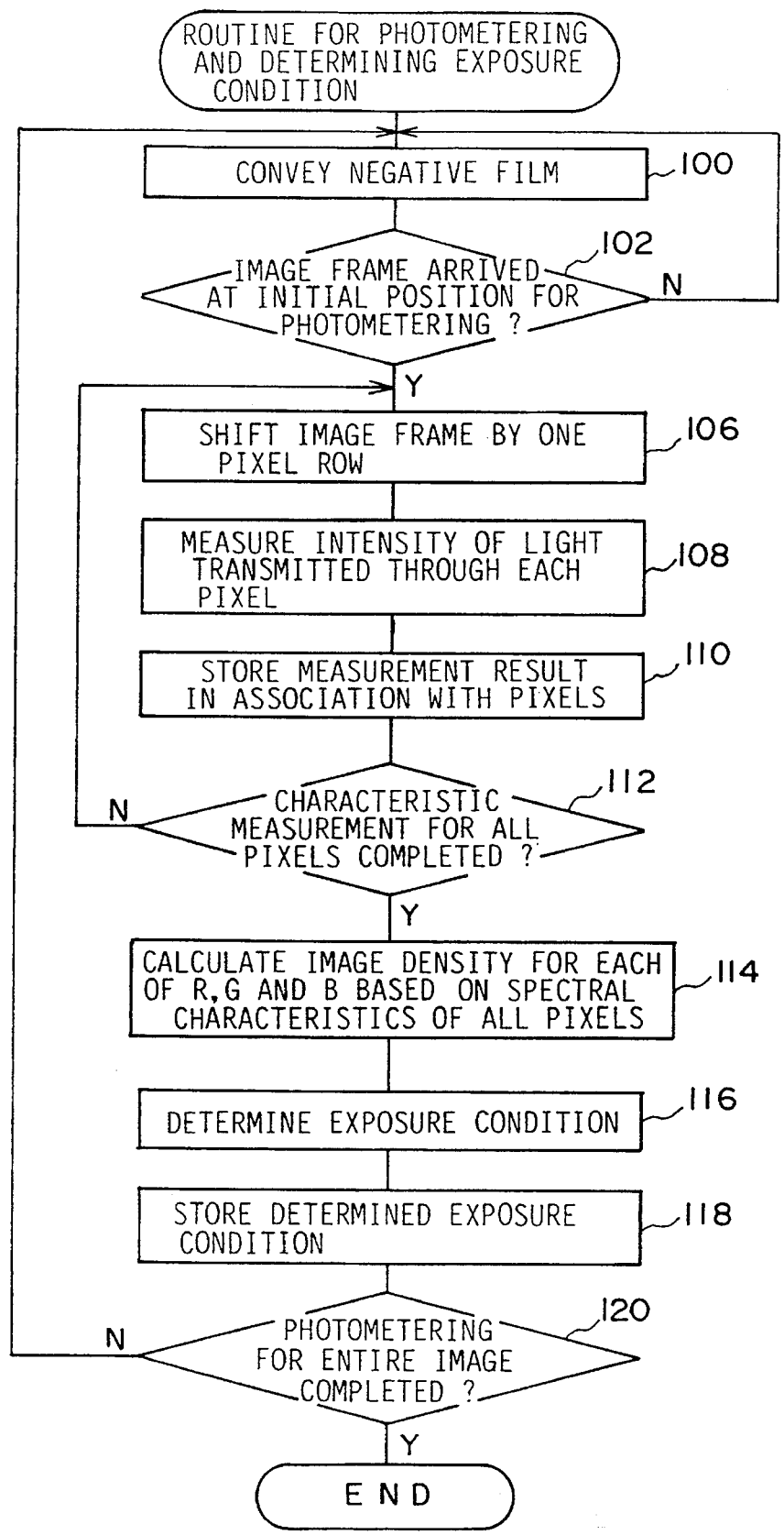
FIG. 6 is a flowchart for illustrating a process of photometering and determining an exposure condition as an operation of an embodiment of the present invention.
Figure 7:
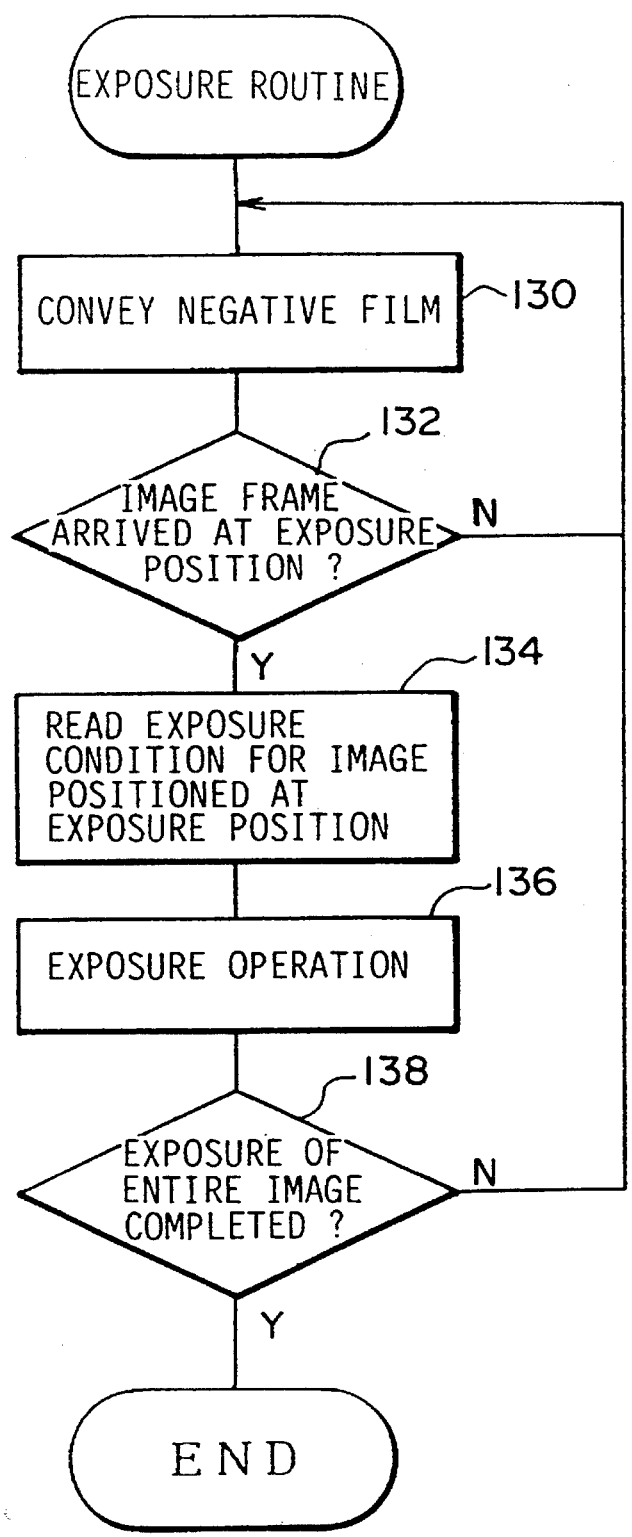
FIG. 7 is a flowchart for illustrating a process of exposure as an operation of an embodiment of the present invention.

Next referring to flow charts shown in FIGS. 6 and 7, a method of the present invention will be described. First, with reference to the flowchart in FIG. 6, a description will be made of a determining process for photometering and exposure conditions. The operation illustrated by the flowchart in FIG. 6 is started when the negative film 34 is set in the printer 30.

Figure 8A:
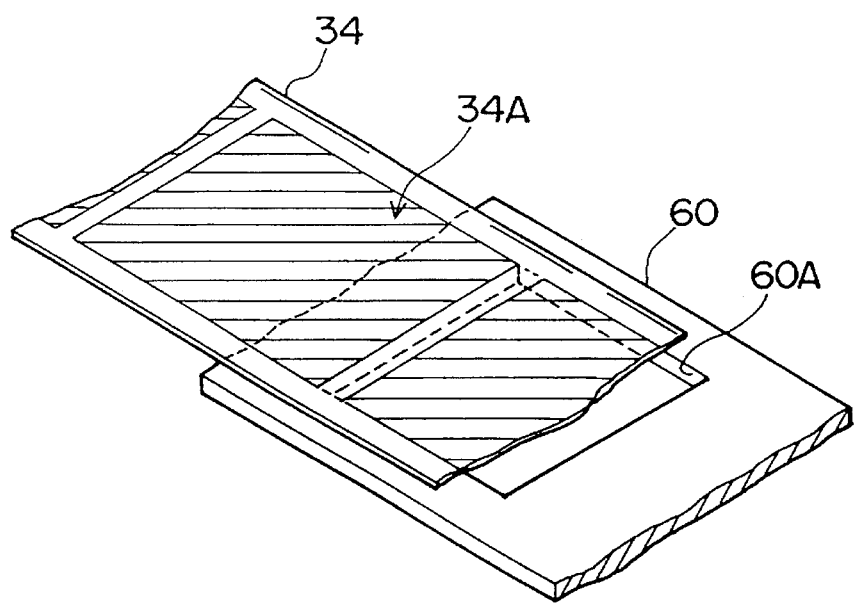
FIG. 8A is a perspective view showing an arrangement of a negative film and a photometering stage at an initial position for photometering.
Figure 8B:
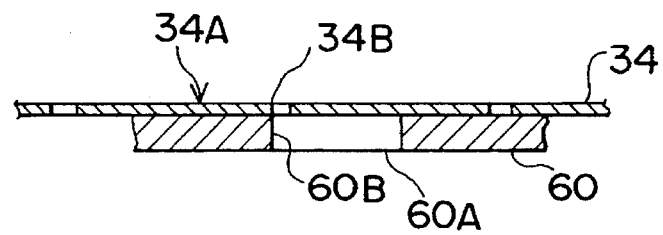
FIG. 8B is a sectional view of FIG. 8A.
Figure 8C:
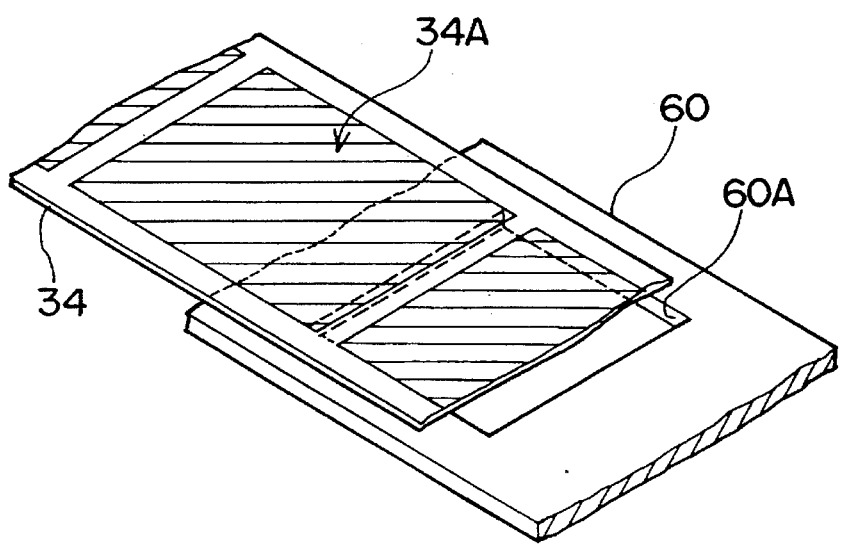
FIG. 8C is a perspective view showing an arrangement in a state where the negative film is shifted by one pixel row equivalence from the initial position for photometering.
Figure 8D:
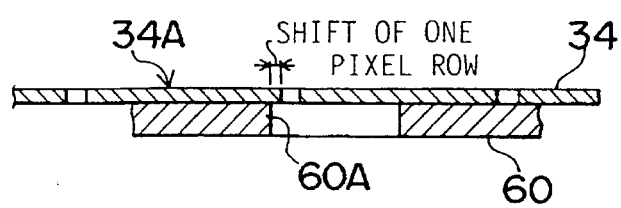
FIG. 8D is a sectional view of FIG. 8D.

In Step 100, the negative film 34 is conveyed by the feeding portion 36 in the direction of the arrow A in FIG. 1. In Step 102, judgement is made about whether or not the image frame 34A recorded on the negative films 34 reaches an initial position for photometering. The initial position for photometering is defined, as shown in FIGS. 8A and 8B, so that an edge 34B of the image frame 34A to be measured is coincident with an edge 60B of the opening 60A in the photometering stage 60. If the judgement is negative in Step 102, the operation returns to 100, and the negative film 34 is conveyed continuously until the image frame arrives at the aforementioned initial position for photometering.

If the judgement in Step 102 is affirmative, the conveying of the negative film 34 is stopped, and the routine proceeds to Step 106, in which the negative film 34 is shifted by one pixel row. By this operation, of the pixels constituting the image frame 34A, the upstream side pixel row (fourteen pixels) in the conveying direction is positioned above the opening 60A. Accordingly, the light emitted from the lamphouse 62, which has passed through the fourteen pixels constituting the aforementioned pixel row, is transmitted through the corresponding interference filter section 24A of the spectral filter 10, to be made incident on the photometer 50. Since, due to effect of interference, the above-mentioned interference filter section 24A transmits a predetermined range of light having the wavelength $\lambda_1$ as a center thereof, the predetermined range of light with the above-said wavelength $\lambda_1$ as a center thereof, which has passed through the aforementioned fourteen pixels, is made incident onto the photometer. In Step 108, the photometer 50 measures the intensity of the incident light wave having a wave length of $\lambda_1$ for each pixel.

In Step 110, all the measurements of light intensity are stored in association with the corresponding pixels and wavelengths. In Step 112, judgement is made regarding whether or not all the pixels have been measured concerning spectral characteristics. If the judgement is negative in Step 112, the routine returns to Step 106, and the negative film 34 is repeatedly shifted by one pixel row. With this operation, the second pixel row from the front of the negative film 34 is laid upon the opening 60A. The light having passed through pixels on the second pixel row, is transmitted through the above interference filter section 24A so as to be incident onto the photometer 50. On the other hand, the light having passed through the frontmost pixel row in the conveying direction is transmitted through a different interference filter section 24B so that the light wave having a wavelength of $\lambda_2$ is only incident on the photometer 50. The intensity of the thus entered light of wavelength $\lambda_2$ is measured and stored in Steps 108 and 110, respectively.

In this manner, the negative film 34 is advanced in the direction of arrow A of FIG. 1, so that light passing through each pixel is introduced one after another to all the interference filter sections 24A to 24M so as to pass therethrough. As a result, light intensity of the aforementioned light after passing through each of the interference section 24A to 24M, namely, the intensity of the light waves respectively having wavelengths $\lambda_1, \lambda_2 \ldots, \lambda_{13}$ is measured. For example, as shown in Table 1 below, spectral sensitivity values $F_{101}, F_{102}, \ldots F_{n13}$ to respective predetermined range of light are stored for entire pixels (1 to n in Table 1).

| Pixel | Central Wavelength of a Predetermined Range | | | | |
|---|---|---|---|---|---|
| | $\lambda_1$ | $\lambda_2$ | $\lambda_3$ | ... | $\lambda_{13}$ |
| 1 | $F_{101}$ | $F_{102}$ | $F_{103}$ | ... | $F_{113}$ |
| 2 | $F_{201}$ | $F_{202}$ | $F_{203}$ | ... | $F_{213}$ |
| 3 | $F_{301}$ | $F_{302}$ | $F_{303}$ | ... | $F_{313}$ |
| . | . | . | . | | . |
| . | . | . | . | | . |
| 4 | $F_{n01}$ | $F_{n02}$ | $F_{n03}$ | ... | $F_{n13}$ |

When the measurement of the spectral sensitivity for all the pixels constituting the image frame 34A as shown above is completed above, the judgement becomes affirmative in Step 112, being followed by Step 114.

In Step 114, based on the spectral sensitivity of each pixel stored in Step 110, photometric measurements for each pixel are processed with reference to the spectral sensitivity distributions of the photometer 50 and the color paper 48 into virtual photometric values for each pixel which would correspond to or be equivalent to photometric values measured by a photometer having the same spectral distribution as a photosensitive material for duplication (here, i.e. the color paper). With the resultant virtual photometric values, the image density of the image frame 34A is calculated for R, G and B. Various processes are known for making the spectral sensitivity distribution of the photometer coincide with the spectral sensitivity distribution of the photosensitive material for duplication. Although a detailed description is not made here, a process can be used, for instance, that described in U.S. patent application Ser. No. 07/593,922 (allowed U.S. patent application) "Exposure Controlling Apparatus" which was filed for by the present applicant and the contents of which are hereby incorporated by reference. The calculation of the image density from photometric measurements for each pixel can be achieved by, for example, taking an average of density values of all the pixels for each color R, G and B.

In a next step, i.e. Step 116, an exposure condition is determined. In this embodiment, the exposure condition is determined by calculating an exposure control value Ej in accordance with the following formula (1):

$$\log Ej = CSj \times CCj \times (Dj - DNj)$$
$$+ \alpha 1 \times KD + \alpha 2 \times KA + \alpha 3 \times KCj + Cj \quad (1)$$

wherein j represents an integer from 1 through 3 dependent upon R, G and B; CSj represents a color slope control value (difference dependent on over-exposure or under-exposure); CCj represents a color correction value; Dj represents a density value of an image on a negative film to be printed (for example, an average density of a whole picture surface); DNj represents an average density of a normal-exposure color negative image on a reference film; $\alpha 1$ represents a density key value; KD represents a step width of a density key; $\alpha 2$ represents a density correction amount; KA represents a step width of a density key; $\alpha 3$ represents a color key value; KCj represents a step width of a color key; Cj represents a constant dependent upon characteristics of the printer, the film and the color paper. In this step, predetermined parameters in the formula (1), corrected density values of the reference negative film stored in advance in the memory of the circuit control 52 and the image density values Dj for each of R, G and B calculated in Step 114 are substituted into formula (1), to thereby determine the exposure condition.

In Step 118, the thus determined exposure condition is stored in the memory of the control circuit 52. Subsequently, in Step 120, judgement is made about whether the photometering operation and the determination of the exposure control are complete for all the image frames recorded on the negative film 32. If the judgement is negative in Step 120, the routine returns to Step 100. Accordingly, When the image frame 34A recorded on the negative film 34 arrived at the photometering stage 60 and the judgment in Step 102 becomes affirmative, measurement is made of the spectral sensitivity to light waves with wavelengths of $\lambda_1, \lambda_2, \ldots \lambda_{13}$ for all the pixels constituting the aforesaid image frame 34A. Based upon the measured results, the exposure condition of the above image frame 34A is determined and stored.

Next a description will be made of an exposure process with reference to a flowchart shown in FIG. 7. It should be noted that the process shown by the flowchart in FIG. 7 is executed in parallel with the process shown in the flowchart in FIG. 6.

In Step 130, the negative film 34 is conveyed by the feeding portion 36 in the direction of the arrow A in FIG. 1. In Step 132, judgement is made about whether or not the image frame 34A recorded on the negative film 34 reaches an exposure position corresponding to the opening provided for the exposure stage 32. If the judgement in Step 132 is negative, the routine returns to 130, and the negative film 34 is continuously conveyed until the image frame arrives at the aforementioned exposure position for photometering. When the image frame 34A recorded on the negative film 34 arrives at the exposure position on the exposure stage 32, the judgement in Step 132 is confirmed, and the routine proceeds to Step 134. In Step 134, the aforesaid image frame 34A is positioned at the exposure position, and the exposure condition for the image 34A stored in Step 118 is read out.

In Step 134, the light adjustment filter 40 is controlled so that the condition under which the color paper 48 is to be exposed coincides with the exposure condition read above. Thus the positioned image frame 34A is exposed onto the color paper 48. In Step 138, judgement is made on whether or not all the images recorded on the negative film 32 are to be subjected to the exposure processing. If the judgment is negative in Step 138, the routine returns to Step 130.

Accordingly, each time the judgement in Step 132 is confirmed in accordance with the arrival of an image recorded on the negative film 34 at the exposure stage 32, the image is positioned in the exposure position. Thereafter, the exposure operation is effected in an exposure condition determined in Step 116. If the judgement is confirmed in Step 138, the routine is completed.

As described above, in this embodiment, since a spectral filter 10 is employed for separating light, a costly prism, a diffraction grating, or the like is not necessary for light-separation. As a result the printer can be constructed at low cost. In addition, the light having passed through the image is successively allotted to and transmitted through the interference filter sections 24A through 24M, to thereby be separated into spectral colors. For this reason, the photometric position is not largely changed compared to cases in which refraction or diffraction is employed for light-separation, so that the photometer 50 can be arranged in a fixed position. Consequently, the optical path along which the spectral light passes, can be shortened resulting in a size reduction of the printer 30. Moreover, light incident on the spectral filter 10 does not need to be formed into parallel light as is required when a prism is used. This improves the utility efficiency of light.

Although the image is divided into 20×14 pixels in this embodiment, the present invention is not limited to this specific division. It is also possible that the manner of division may be changed depending upon the size of image.

In this embodiment, a transmission-type interference filter is employed, but can be replaced with a reflection-type one. Further, the interference filter is not limited to terrace-shaped ones used in this embodiment. It is possible to employ an interference filter having a wedge shape in which the thickness varies continuously.

Furthermore, in this embodiment, although the relative movement between the negative film 34 and the spectral filter is effected by conveying the negative film 34, the spectral filter 10 maybe adapted to move relative to the negative film 34 while the negative film 34 is stationary.

Moreover, in this embodiment, while photometric measurement and exposure of the images are conducted in different positions, it is possible to effect photometric measurement and exposure in the same position. For example, the arrangement can be constructed such that an image frame is positioned in a predetermined place, the spectral filter 10 is moved as stated above, to effect photometric measurement. Then the spectral filter 10 is retracted to determine an exposure condition, so as to conduct an exposure operation.

Although this invention has been described in conjunction with specific embodiments thereof, it is possible to put this invention into practice in various other manners without being limited by those stated heretofore. The scope of this invention is described in the appended claims and any modification and variation within the range equivalent to the scope of the claims falls within the scope of the invention.

What is claimed is:

1. A method of photometering an image, comprising the steps of:

irradiating light onto an image recorded on a film;

causing the light to pass through said image incident onto a spectral filter composed of a plurality of interference filter sections which are arranged along one direction and each of which selects a certain wavelength range of light having a different wavelength as the center thereof;

photometering light waves after passing through respective pixels and being selected by said interference filter sections, for each pixel of said image, with respect to each of the light waves having different wavelength ranges while relative movement between said interference filter and said film is effected in said one direction; and effecting irradiation of light on said film on a stage having an opening through which the light passes, said opening being divided along said one direction into a number of divisions equal to the plurality of interference filter sections, said spectral filter being optically arranged such that each of light waves which pass through different divisions of said opening is made incident on respective interference filter sections, photometering being effected by a photometer comprising a plurality of photosensors arranged in two dimensions so that during one photometering step, light intensity data at different wavelengths being obtained for all of the pixels corresponding to said opening, and while moving said film forward onto said opening in said one direction by the width of a division of said divided opening as a unit, light transmitted through pixels of said film present in each division and passing through an interference filter section optically corresponding to the division being measured for light intensity so as to measure the transmission light intensity with respect to each of said wavelength ranges for each pixel on said film.

2. A method of photometering an image according to claim 1, wherein said division divided has a size approximately equivalent to the pixel row on said film.

3. A method of photometering an image according to claim 1, wherein said spectral filter is constructed such that said interference filter sections are arranged in a terraced form in said one direction.

4. A method of photometering an image according to claim 1, wherein said spectral filter is constructed such that thickness of said interference filter sections is continuously increased in said one direction.

5. A method of photometering an image according to claim 1, wherein said spectral filter is composed of a transmission type interference filter.

6. A method of photometering an image according to claim 1, wherein said spectral filter is composed of reflection type interference filter.

7. A method of photometering an image according to claim 1, wherein said spectral filter is moved in said one direction with respect to said film.

8. A method of photometering an image according to claim 1, wherein said photometering is carried out by and in an exposure apparatus.

9. A method of measuring image density of a color original in advance for adjusting the exposure with which a color image of the color original is printed on a photosensitive material, comprising:

conveying a negative film to a photometering stage provided with an opening through which light passes;

irradiating light onto an image recorded on the negative film on said stage;

causing light which has passed through each pixel of the image, to strike a spectral filter with a plurality of interference filter sections each of which transmits light of only a certain wavelength range of light having a different wavelength as the center thereof and which are arrayed in a conveying direction of the negative film;

said spectral filter being optically arranged such that light passing through respective divisions into which said opening is divided as a unit of the pixel row on said negative film along the conveying direction of the negative film, is made incident onto different interference filter sections; and photometering each of light waves having passed through respective pixels and respective interference filter sections by means of a photometer having a plurality of photosensors arrayed in two dimensions so that during one photometering step, light intensity data at different wavelengths may be obtained for all of the pixels corresponding to said opening; and while said negative film on said stage is moved forward by the width of a pixel row as a unit in said conveying direction of the negative film, each light wave having passed through said respective pixels and said respective interference filter sections of said spectral filter is photometered by means of said photometer, so as to measure the light having passed through respective pixels on said negative film for various wavelengths.

10. A method of controlling an exposure of a negative film comprising:

irradiating light onto an image recorded on a negative film;

causing light which has passed through respective pixels of the image to strike a spectral filter having a plurality of interference sections, each selecting only a predetermined wavelength range of light having a different wavelength as the center thereof, and arrayed in one direction;

while said spectral filter and said negative film are being moved relative to each other in said one direction, light waves having passed through said respective pixels and each having a different wavelength selected by said interference filter sections are photometered, the photometering being effected by a photometer comprising a plurality of photosensors arranged in two dimensions so that during one photometering step, light intensity data at different wavelengths may be obtain .ed for all of the pixels corresponding to said opening;

storing the photometric values for each pixel with respect to respective wavelengths;

correcting the stored values so as to make them coincident with a spectral sensitivity distribution of a photosensitive material;

determining image density for each of R, G and B from the corrected photometric values for each pixel;

calculating an exposure control value by substituting the calculated image densities of the negative film into a formula determining an exposure condition; and exposing the negative film based on the control value.

11. An apparatus for measuring image density of a color original in advance for adjusting the exposure with which a color image of the color original is printed on a photosensitive material, comprising:

a photometering stage for supporting a negative film, provided with an opening through which light passes;

means for irradiating light onto an image recorded on the negative film on said stage;

a spectral filter with a plurality of interference filter sections each of which receives light having passed through a pixel of said image and transmits light of only a certain wavelength range of light having a different wavelength as the center thereof and which are arrayed in a conveying direction of the negative film;

optical means for causing light, which has passed through respective divisions into which said opening is divided as a unit of the pixel row on said negative film along the conveying direction of the negative film, to strike different interference filter sections of said spectral filter;

means for photometering each of light waves having passed through respective pixels and respective interference filter sections of said spectral filter, said photometering means comprising a plurality of photosensors which are arranged in two dimensions;

shifting means for shifting the negative film on said stage successively in said conveying direction of the negative film by the width of a pixel row as a unit; and controlling means for controlling said shifting means so as to measure the transmitted light having passed through respective pixels on said negative film for different wavelengths each of which is transmitted by said interference filter section.

* * * * *